United States Patent [19]

Maucher et al.

[11] Patent Number: 4,520,913

[45] Date of Patent: * Jun. 4, 1985

[54] DEVICE FOR SELECTIVELY SEPARATING AND CONNECTING A ROTATABLE SHAFT

[75] Inventors: Paul Maucher, Sasbach; Oswald Friedmann, Lichtenau, both of Fed. Rep. of Germany

[73] Assignee: Luk Lamellen und Kupplungsbau GmbH, Bühl, Fed. Rep. of Germany

[ * ] Notice: The portion of the term of this patent subsequent to Dec. 13, 2000 has been disclaimed.

[21] Appl. No.: 405,402

[22] Filed: Aug. 5, 1982

Related U.S. Application Data

[63] Continuation of Ser. No. 143,935, Apr. 24, 1980.

[30] Foreign Application Priority Data

Apr. 27, 1979 [DE] Fed. Rep. of Germany ....... 2917137

[51] Int. Cl.³ .................. F16D 13/44; F16D 21/00
[52] U.S. Cl. .................. 192/48.8; 192/70.27; 192/89 B; 192/96
[58] Field of Search .......... 192/48.1, 48.8, 70.27, 192/70.28, 89 B, 70.16, 96, 106.1, 0.096, 0.075, 85 CA; 74/572; 180/165

[56] References Cited

U.S. PATENT DOCUMENTS

| | | | |
|---|---|---|---|
| 2,165,670 | 7/1939 | Wales | 192/70.16 |
| 2,281,898 | 5/1942 | Whitten | 192/107 |
| 2,687,789 | 8/1954 | Nardone | 192/96 X |
| 2,931,476 | 4/1960 | Zeidler et al. | 192/70.16 X |
| 3,283,866 | 11/1966 | Giacosa | 192/96 |
| 3,413,868 | 12/1968 | Iizuka | 74/371 |
| 3,666,062 | 5/1972 | Riese | 192/70.28 |
| 3,842,954 | 10/1974 | Honemann | 192/96 |
| 3,886,810 | 6/1975 | Sugiyama et al. | 180/165 X |
| 4,252,208 | 2/1981 | Heidemeyer et al. | 192/0.077 X |
| 4,279,178 | 7/1981 | Todd | 74/745 |
| 4,420,070 | 12/1983 | Maucher et al. | 192/48.8 |

FOREIGN PATENT DOCUMENTS

| | | | |
|---|---|---|---|
| 0045860 | 2/1982 | European Pat. Off. | |
| 437750 | 7/1948 | Italy | 192/106.1 |
| 348057 | 9/1960 | Switzerland | 192/110 B |
| 1381332 | 1/1975 | United Kingdom | 192/110 |
| 1394118 | 5/1975 | United Kingdom | 192/96 |
| 1416552 | 12/1975 | United Kingdom | 192/96 |

*Primary Examiner*—Rodney H. Bonck
*Attorney, Agent, or Firm*—Peter K. Kontler

[57] ABSTRACT

Device for selectively separating and connecting a rotatable shaft, such as the crankshaft of an internal combustion engine, to a flywheel assembly of a friction clutch has a bearing in which the flywheel assembly is rotatable relative to the shaft, a friction plate non-rotatably connected to the shaft and having friction surfaces disposed at the opposite sides thereof, two pressure plates forming part of the flywheel assembly and each having a friction surface cooperating with one of the friction surfaces of the friction plates, the pressure plate being axially movably but non-rotatably connected to each other and, one of the pressure plates being held against axial movement relative to the bearing, operating means for moving the other of the pressure plates axially, spring means disposed on the friction plate between the connection to the shaft and the friction surfaces disposed thereon for biasing the friction plate in direction away from the axially-fixed pressure plate, and stop means for limiting the extent of axial movement of the friction surfaces of the friction plate.

43 Claims, 2 Drawing Figures

Fig.1

DEVICE FOR SELECTIVELY SEPARATING AND CONNECTING A ROTATABLE SHAFT

This application is a continuation of application Ser. No. 143,935, filed Apr. 24, 1980.

The invention relates to a device for selectively separating and connecting a rotary shaft, such as the crankshaft of an internal combustion engine, with a flywheel assembly which is rotatably supported in a bearing relative to the latter and forms part of a friction clutch, wherein a friction plate is fixedly or non-rotatably connected to the shaft and the flywheel assembly contains two pressure plates which are provided with corresponding friction surfaces for the friction plate on both sides thereof, wherein the pressure plates are non-rotatably fixed to each other but are movable relative to each other; in the axial direction, and wherein one of the pressure plates is connected with the bearing support against movement in the axial direction whereas the other pressure plate is acted upon and is movable by suitable operating means.

In a previously proposed friction clutch unit of this type, one pressure plate of the clutch is moved by a cup-spring in a direction to separate the flywheel mass and the cup-spring also serves to transmit torque. The clutch can be disengaged by a hydraulic piston acting upon the cup-spring. This clutch can be used, for example, to operate a motor vehicle with the lowest possible fuel consumption. For this purpose, attention is drawn to operating conditions under which the engine does not drive the vehicle, for example, when the car is coasting or idling and also during short stops of the car, for example, at traffic light stops. Under such operating conditions, the connection between the engine and the flywheel assembly is interrupted, and the engine is stopped while the flywheel assembly continues to rotate. When the hereinafore-described drive-conditions are terminated, the flywheel is again coupled to the engine in order to start the engine again. Furthermore, the heretofore-proposed friction clutch unit also contains a second friction clutch which is used for another purpose besides its usage when starting and shifting to various speeds, under the operating conditions when the engine is not driving. This condition is met when the car is coasting and the engine is stopped and the flywheel mass continues to turn. The other purpose is for interrupting the connection between the flywheel assembly and therefore also with the engine and the driving wheels. After restarting the engine, the connection between the engine and the drive wheels is reestablished by this second clutch. This additional clutch has one axially fixed pressure plate and one axially movable pressure plate. The latter is loaded and released, respectively, by a cup-spring, and, in the engaged condition of the clutch, a friction disc is clamped between the pressure plates, and the friction disc is supported against radial movement by a transmission shaft, but is movable in the axial direction. By virtue of this capability of axial movement, it is assured that in the disengaged state, i.e. particularly also when the first clutch is disengaged for separation of the flywheel mass, this second clutch does not cause any drag and braking moment, which would lower the number of revolutions of the flywheel assembly.

It is accordingly an object of the invention to provide a novel and improved device for selectively separating and connecting a rotatable shaft from and to the flywheel assembly of a friction clutch; and to construct the clutch for separating and connecting the flywheel assembly in such a manner that no drag and braking moment occurs between the friction disc and the associated pressure plates. Another object of the invention is to provide a friction clutch unit whose load capability with respect to performed coupling-work is considerably increased, which is simpler, less expensive, better functioning and more reliable then conventional clutches and which also reduces the time for and cost of adjustment and installation labor. Furthermore, the space required for the clutch unit in the axial direction is to be reduced.

With the foregoing and other objects in view, there is provided, in accordance with the invention, a device for selectively separating and connecting a rotatable shaft, such as the crankshaft of an internal combustion engine, from and to the flywheel assembly of a friction clutch, including a bearing in which the flywheel assembly is rotatable relative to the shaft, a friction plate non-rotatably connected to the shaft and having friction surfaces disposed at the opposite sides thereof, two pressure plates forming part of of the flywheel assembly and each having a friction surface cooperating with one of the friction surfaces of the friction plate, the pressure plates being axially movably connected but being held against angular movement relative to each other and, one of the pressure plates being axially-fixed to the bearing, operating means for moving the other of the pressure plates, spring means disposed on the friction plate between the connection to the shaft and the friction surface disposed thereon for biasing the friction plate in direction away from the axially-fixed pressure plate, and stop means for limiting the extent of axial movement of the friction surfaces of the friction plate. It is not only made certain thereby that, when the clutch is disengaged, i.e. in response to movement of the axially movable pressure plate away from the friction surfaces, that these friction surfaces are automatically lifted off, and move in the direction of movement of the axially movable pressure plate, but also that the extent of movement of these friction surfaces is limited. By virtue of this provision, particularly if stops are used, the extent of axial movement of the friction surfaces is limited at least to approximately half of the extent of movement of the axially movable pressure plate and it is made certain that the separation of the friction surfaces from the axially fixed pressure plate takes place so that no contact between the parts exists. However, it is also assured that the axial movement of the friction plate can only go so far that, in the disengaged state of the clutch, a safe distance to the axially movable pressure plate is maintained.

In accordance with another feature of the invention, the spring means are rigid in direction of rotation and elastic in axial direction, the spring means having two ends, one of the ends being fixed to the shaft and the outer of the ends having the friction surface of the friction plate disposed thereat concentrically to the shaft. This is done, for example, by leaf springs, star-springs, membranes or the like.

In accordance with a further feature of the invention, there are provided means for adjusting the limited axial movement of the friction surfaces of the friction plate. In accordance with an added feature of the invention, the spring means include means for rigidly holding the spring means in direction of rotation, the stop means being effective between the rigid means and the friction surfaces of the friction plate.

In accordance with an additional feature of the invention, the spring means include means for elastically holding the spring means in axial direction, the stop means being effective between the elastic means and the friction surfaces of the friction plate.

In accordance with still another feature of the invention, the friction plate includes a carrier for the friction surface thereof, the spring means and carrier being axially-movable with respect to each other, and the stop means being in the form of screws adjustably fastened to the carrier and movable into contact with the spring means. In this way, it can be particularly advantageous if the friction surfaces, for example friction linings, are provided at both sides of a liner-carrier disc which is fastened to the crankshaft through the means which are elastic in the axial direction but rigid in the circumferential direction.

In, in accordance with still a further feature of the invention, the screws are self-locking. The stop-means, for example, in the form of screws, can then be provided in tapped holes of this lining-carrier disc, and their shanks can extend through the elastic means in the axial direction, and a head provided at the other side can be the means which limits the motion.

In accordance with still another feature of the invention, the stop means are plastic members. For example, the plastic configurations can be rivets, bends or off-sets of the lining carrier disc, or the like.

In accordance with an additional feature of the invention, the stop means limits the axial movement of the friction surfaces of the friction plate to at least substantially half the axial movement of the other of the pressure plates.

In accordance with yet another feature of the invention, there are provided means for substantially eliminating stray movements of the friction surfaces of the friction plate when controlled by the stop means.

In accordance with a further feature of the invention, the bearing includes a hub which is rotatable relative to the shaft, and there is provided a housing part such as a dish-shaped housing disposed on the rotatable bearing hub, the axially-fixed pressure plate being concentrically-supported on the housing part, and the axially movable pressure plate being disposed in an axial space formed by the housing part between the axially-fixed pressure plate and the housing part. Such configuration results in a construction which occupies little space in the axial direction, because the bearing and the clutch are essentially disposed at the same axial height.

In accordance with yet an added feature of the invention, there are provided axially elastic and rotationally fixed means for fixedly connecting the movable pressure plate to the housing part. For example, this may be done by leaf springs.

In accordance with yet an additional feature of the invention, the connecting means are disposed in the axial space between the housing part and the movable pressure plate. This feature also saves space as considered in the axial direction.

In accordance with another feature of the invention, there are provided axially-directed protrusions integral with the movable pressure plate and extending through openings formed in a radially extending portion of the housing part. This is a practical, and with respect to the heat load, advantageous embodiment of such a clutch.

In accordance with a further feature of the invention, there is provided a second clutch having an axially-fixed pressure plate disposed in vicinity of the housing part for the friction clutch.

In accordance with an added feature of the invention, there is provided a cup-spring disposed in an axial space formed between the axially-fixed pressure plate of the second clutch and the protrusions. The applying means in the form of a cup-spring bears against such protrusions and reacts against this pressure plate.

In accordance with an additional feature of the invention, the radially outermost portion of the cup-spring is axially braced against the axially-fixed pressure plate of the second clutch and a second portion bearing against the protrusions. Because of its position between the housing part and the axially fixed pressure plate of the second clutch, the cup-spring can be exposed to a cooling air flow passing over it.

In accordance with another feature of the invention, for operating, i.e. for disengaging the clutch, the operating means is in the form of a pull rod which is coaxial with the shaft, and there is provided a throw-out plate disposed at the innermost portion of the cup-spring, the throw-out plate being movable axially by said pull rod.

In accordance with a further feature of the invention, the pull rod disengages the first-mentioned clutch when moved axially in a direction away from the axially-fixed pressure plate of the first-mentioned clutch.

In accordance with an added feature of the invention, the direction of disengagement of the second clutch is counter to the direction of disengagement of the first-mentioned clutch. The disengagement which, as mentioned, is provided at the axially fixed pressure plate, because in this case the axial forces on the bearing cancel each other out, at least substantially, when both clutches are disengaged.

In accordance with an additional feature of the invention, a radial flange of the bearing hub has apertures affording access to holding screws which secure the friction plate to the bearing hub.

In accordance with still another feature of the invention, the throw-out plate has apertures substantially in alignment with the apertures of the radial flange. In this case the clutch unit can be secured by screws to the crankshaft as a pre-assembled unit comprising the axially fixed pressure plate, friction plate, axially movable pressure plate, basket or cage-shaped housing part including the bearing, the cup-spring, the throw-out plate and the axially fixed first pressure plate for the second clutch.

In accordance with still a further feature of the invention, there is provided bayonet means disposed on the pull rod and plate for positively locking the pull rod to the throw-out plate when rotating the pull rod relative to the throw-out plate subsequent to insertion of the pull rod into the throw-out plate.

In accordance with still a further feature of the invention, a trunnion which is coaxial with the throw-out plate has an extension extending into a bore formed in the bearing hub for axially guiding and supplying fixed radial support for the throw-out plate.

In accordance with still an additional feature of the invention, an internal thread in the bore of the hub meshes with an external thread of the pull rod.

In accordance with yet an added feature of the invention, there is provided a guide bearing disposed between the extension and the bearing hub in the bore formed therein.

In accordance with yet a further feature of the invention, there are provided spring means disposed between the throw-out plate and the radial flange for yieldably biasing the throw-out plate against the radially innermost portion of the cup-spring.

In accordance with yet an added feature of the invention, there are provided guide pins disposed on the radial flange and extending axially through openings of the throw-out plate. The springs can be concentrically disposed in relation to the guide pins which are secured in the flange of the bearing hub to restrain the throw-out plate in the circumferential direction.

In accordance with yet an additional feature of the invention, there are provided axially-directed bosses, such as pin-shaped protrusions, integral with the axially-fixed pressure plate of the second clutch and attached to the housing part, the bosses extending through openings formed in the cup-spring for concentrically securing the cup-spring.

In accordance with another feature of the invention, the housing part is form-fittingly connected to the one axially-fixed pressure plate.

For this purpose, in accordance with a further feature of the invention, there are provided circumferentially disposed profiles on the one axially-fixed pressure plate, and gripping portions disposed on the housing part and overlapping the profiles, as considered in the axial direction.

In accordance with an added feature of the invention, the radially outermost portion of the axially-fixed pressure plate of the first-mentioned clutch and the housing part are welded together, for example, by electron-beam welding.

In friction clutch units of the hereafter-described type, one construction form proved itself as particularly advantageous, as specially compact in the axial direction and furthermore as simple and easy to install. This form has its parts assembled in a specific way, as considered in the axial direction.

Therefore, in accordance with an additional feature of the invention, there are provided, as viewed in the axial direction, the one axially-fixed pressure plate of the first-mentioned clutch, the friction surfaces of the friction plate, the other movable pressure plate of the first-mentioned clutch, a cup-spring having the radially outermost portion thereof braced against the housing part, the housing part having a radially extending portion braced against the axially movable pressure plate, the axially fixed pressure plate of the second clutch, friction surfaces of the second clutch, a pressure plate of the second clutch, and a cup-spring of the second clutch, the housing part being connected to the axially-fixed pressure plate of the second clutch.

In accordance with a concomitant feature of the invention, there are provided spacers or bosses extending axially through the cup-spring, and axially elastic but rotationally fixed means for connecting the spacers to the axially-fixed pressure plate of the second clutch at the housing part. In this case, the axially extending bosses can serve for centering the cup-spring. Furthermore, the means which are elastic in the axial direction, but rigid in the circumferential direction, such as leaf springs, can be clamped between the basket- or cage-shaped housing part and the axially fixed pressure of the second clutch. In this case, the bearing hub can also be provided with a flange to which the axially fixed pressure plate for the second clutch is fastened, so that this flange carries the clutch assembly, fixed in an axial direction, but rotatable relative to the crankshaft in the circumferential direction.

According to a further development of the invention, one of the outer surfaces of the axially fixed structural parts, the second or first pressure plate, or possibly the cover of the second clutch, but particularly the radially outermost portion of the dish-shaped housing part, has an engagement surface which is a starting surface for a friction wheel of a friction wheel starter for accelerating the flywheel assembly to a number of revolutions suitable for starting the flywheel clutch as well as the transmission clutch in the disengaged state.

Other features which are considered as characteristic of the invention are set forth in the appended claims.

Although the invention is illustrated and described herein as embodied in a device for selectively separating and connecting a rotatable shaft, it is nevertheless not intended to be limited to the details shown, since various modifications and structural changes may be made therein without departing from the spirit of the invention and from the scope and range of equivalents of the claims.

The construction and method of operation of the invention, however, together with additional objects and advantages thereof, will be best understood from the following description of specific embodiments when read in connection with the accompanying drawing, in which:

Figure 1:
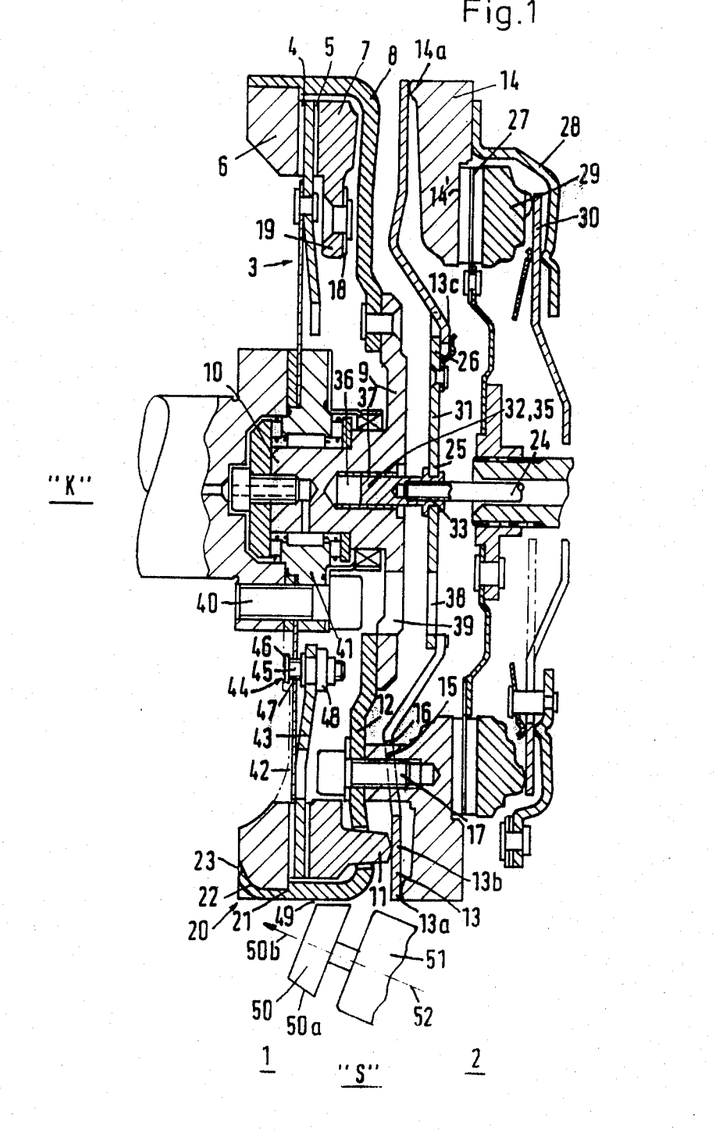
FIG. 1 is a diagrammatic, fragmentary, partially cross-sectional view of a first typical embodiment of a device for selectively separating and connecting the crankshaft of an internal combustion engine with a flywheel mass which is rotatably supported in relation to the latter, wherein a second clutch for shifting a transmission is fastened to the flywheel assembly.

Referring now to the figures of the drawing and first particularly to FIG. 1, thereof, there is shown, in section, the flywheel assembly "S" of an internal combustion engine, which can be coupled and uncoupled by a clutch 1 from the crankshaft "K" of an internal combustion engine. Also shown is the second clutch 2.

The crankshaft "K" is fastened to a friction plate 3, which is provided with friction surfaces 4 and 5, and at each side thereof carries a pressure plate. There are a first pressure plate 6 at the side toward the internal combustion engine, and a second pressure plate 7. The pressure plate 6 is connected through a basket-shaped housing part 8 which encloses the friction disc or carrier plate 3 and the pressure plate 7, with a radial flange 9 of a bearing hub 10. The pressure plate 6 is fixed on the hub 10 in the axial direction, but is rotatably supported thereon in relation to the crankshaft "K".

The pressure plate 7 has axial protrusions 11 extending through openings in the radially extending portion 12 of the basket-like housing part 8. The pressure plate 7 is pressed by the spring action of a cup-spring or diaphragm spring 13 in the direction toward the friction surfaces 4, 5 of the clutch plate 3 and the axially-fixed pressure plate 6. For this purpose, the radially outermost portion 13a of the cup-spring 13 bears upon an axially-fixed support 14. The support 14 simultaneously constitutes the axially-fixed pressure plate of the second clutch 2. The cup-spring 13 tilts on the support 14, and engages the protrusions 11 with its intermediate or second portion 13b.

The axially-fixed pressure plate 14 of the second clutch 2 is provided with axially-directed post- or pin-shaped bosses or extensions 15, which extend through openings 16 of the cup-spring 13. The bosses 15 ensure that the axis of the cup-spring 13 coincide with the axis of rotation of the friction clutch unit. Furthermore, the pressure plate 14 is secured to the housing 8 by screws 17.

The axially-movable pressure plate 7 of the first clutch 1 is connected with the basket-like housing part 8 by torque transmitting means in the form of axially yieldable leaf springs 18. The connection between the pressure plate 7 and the housing part 8 is fixed as considered in the direction of rotation, but the pressure plate 7 is movable in the axial direction. The leaf springs 18 are disposed between the pressure plate 7 and the radially-extending portions of the basket-shaped housing part 8. The springs 18 are fastened at one side thereof to the radially-inwardly pointing portions 19 of the pressure plate 7 and the other side thereof to the radially extending portions 12 of the housing part 8. The springs 18 are prestressed in such a manner that the pressure plate 7 moves away from the axially-fixed pressure plate 6 and remains in contact with the cup-spring 13 when the load is removed from the cup-spring 13. It is advantageous for fastening the leaf springs 18 to the radial portions of the basket-shaped housing 8, if means such as the screws or pins 17 for the axially-fixed pressure plate 14 of the second clutch 2 are used. The cup or dish-shaped housing part 8 and the pressure plate 6 are connected to each other for axial and angular movement by a form-fit or clamp 20 or by a welded joint which is not shown. A form fitting connection is one established by mating portions of the parts themselves. The dished or cage-like housing part 8 is provided with a shoulder 21 against which the pressure plate 6 is clamped as a result of bending of the radially-extending or rolling over regions 22 of the dished housing part. In this way, the bent-over regions 22 extend into profiles 23 which are provided at the outer circumference of the pressure plate 6 to prevent rotation of the parts 6, 8 relative to each other.

A pull-rod 24 is provided for disengaging the clutch 1 i.e., for moving the pressure plate 7 axially. The pull-rod 24 is connected with a disc-shaped throw-out or disengagement plate 25 whose marginal portion 26 engages the innermost portion 13c of the disc or cup-spring 13. When the pullrod 24 is pulled to the right in FIG. 1 as seen by a viewer, the cup-spring 13 pivots around the pivot 14a of the pressure plate 14. This makes it possible for the pressure plate 7 to move to the right.

To engage the clutch 1, the pull-rod 24 is moved to the left, so that the cup-spring 13 moves the pressure plate 7 to the left, whereby the clutch disc 3 is again clamped between the axially-fixed pressure plate 6 and the pressure plate 7.

The axially-fixed pressure plate 14 for the second clutch 2 has a friction surface 14' for the clutch-disc 27 of the second clutch 2, the housing or cover 28 of which is secured by screws to an area the axially fixed support 14. The second friction surface for the clutch-disc 27 is provided on a pressure plate 29 which is acted upon by a cup-spring or diaphragm spring 30 in a conventional manner. The clutch disc 27 which is mounted on a hollow transmission shaft that is held against radial movement but is free to move axially, is clamped between the first and second pressure plates 14 and 29 in a manner which is known in and of itself. The clutch 2 is disengaged by moving the central portion of the cup spring 30 to the left, i.e. counter the direction of movement of the central portion of the spring 13 in order to disengage the clutch 1.

The throw-out plate 25 has a median portion 31 which is connected with a coaxial trunnion or post 32. The thread 33 for the pull-rod 24 is in mesh with the internal thread of a protrusion 35 which forms part of the trunnion 32, and extends into a bore 36 in the bearing hub or journal 10 to guide the plate 25 during axial movement and to prevent radial movement of this plate. Furthermore, to obtain easier slidability of the plate 25, a bushing 37 for the protrusion 35 of the trunnion 32 is provided in the bore 36 of the bearing hub 10.

Registering apertures 38, 39 are respectively provided in the plate 25 and in the hub 10 which latter serves to rotatably mount the flywheel mass "S" with respect to the crankshaft "K". Holding screws 40 for non-rotatably connecting the clutch disc 3 and the bearing part 41 to the crankshaft "K" are accessible through the aligned apertures 38, 39.

The clutch disc 3 of the clutch 1 is connected with the crankshaft "K" by a part 42 in such a manner that it is held against rotation but is movable axially of the clutch. For this purpose, a carrier 43 for the friction surfacings 4 and 5 is connected to the crankshaft "K" through the medium of the part 42 which constitutes a yieldable membrane or diaphragm 42. The spring action of the membrane 42 is directed away from the axially-fixed pressure plate 6 (i.e., the friction plate 3 is yieldably biased toward the pressure plate 7) and the spring motion or path thereof is limited in the axial direction by stop-means 44 in such a manner that the extent of axial movement of the friction surfaces 4, 5 is at least approximately half the extent of axial movement of the movable pressure plate 7.

The stop-means 44 constitute bolts 45 whose heads 46 limit the extent of axial movement of the membrane 42 and friction surfaces 4, 5. The threaded portions or shanks 47 of the bolts 45 extend through the elastic membrane 42 and are adjustably connected with the carrier 43 by nuts 48 between the loci of connection of the membrane 42 to the shaft "K" and the friction surfaces 4, 5. It is practical to distribute the bolts 45 uniformly in the circumferential direction of the friction disc 3 so that, in addition to limiting axial movements of the membrane 42, they can also limit the side play of the clutch disc 3.

In the embodiment of FIG. 1, the stop-means 44 are effective between the axially-elastic means 42 and the carrier 43.

Figure 2:
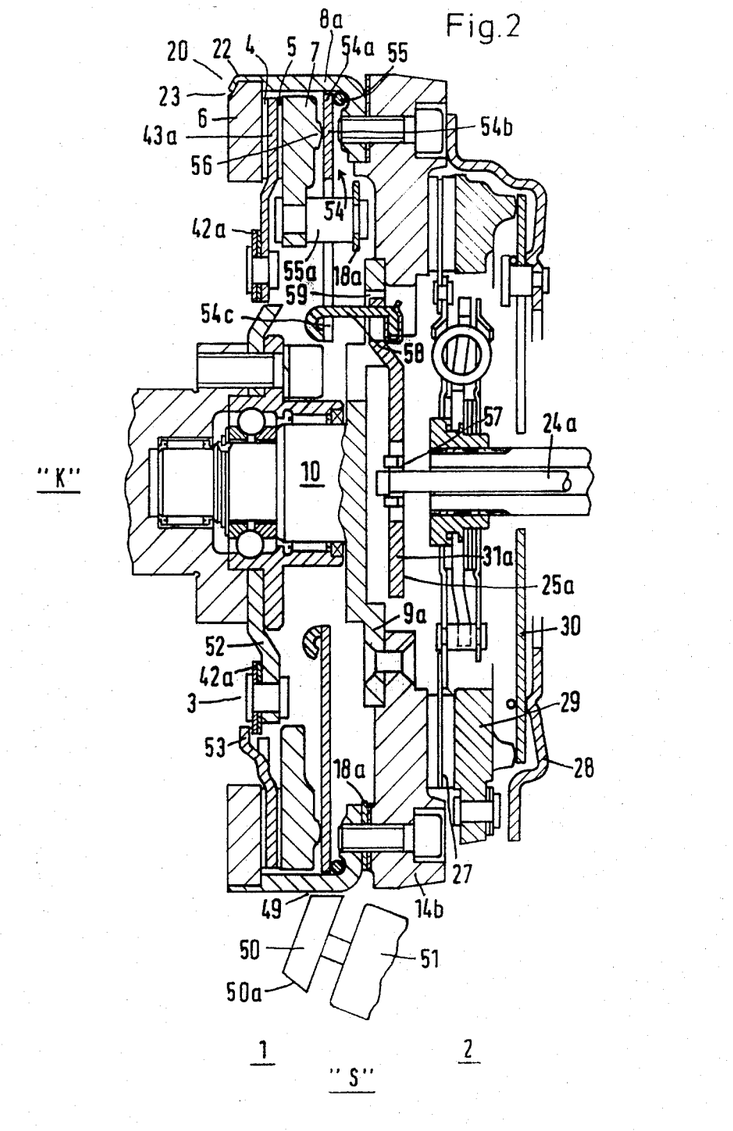
FIG. 2 is a similar view of a second typical embodiment of a device according to the invention with a construction differing from the one shown in FIG. 1.

However, and as shown in FIG. 2, the stop-means can also be effective between a part that is fixed to the crankshaft and the friction surfaces or the friction surface carrier.

In principle, the unit which is illustrated in FIG. 2 functions in the same way as the unit of FIG. 1. However, its construction and its parts differ in several respects from the unit shown in FIG. 1. Equivalent parts of the units shown in FIGS. 1 and 2 are denoted by the same reference numerals.

FIG. 2 also shows the flywheel assembly "S" which can be disengaged from the crankshaft "K" though the clutch 1, the second clutch 2, and the carrier plate 3 which is fastened to the crankshaft "K" and is provided with friction surfacings 4 and 5, the latter being fastened to the friction surfacing carrier disc 43a. The friction surfacing carrier 43a is connected to the crankshaft "K" by spring means which, in this embodiment are formed by leaf springs 42a. Therefore, the carrier 43a is rigidly connected to the fixed part or flange 52 of the crankshaft but is axially movable on the latter. For this purpose the leaf springs 42a are, at one side thereof, articulately connected with the carrier 43a and at the other side with the flange 52 which is fixed to the crankshaft. This effects a spring action in a direction away from the axially-fixed pressure plate 6.

For limiting the extent of axial movement of the friction surfaces 4,5 of the carrier 43a, stop means are provided in form of lobes 53, which are part of the friction surface carrier 43a, and come in contact with the leaf springs 42a. Obviously these lobes 53 can also act in conjunction with the flange 52.

The axially-fixed pressure plate 14b of the second clutch 2 is fastened to the flange 9a of the bearing hub 10 for the support of the flywheel assembly "S" which is rotatable in relation to the crankshaft "K".

The axially-fixed pressure plate 6 of the first clutch 1 is connected with the axially-fixed pressure plate 14b through a basket-shaped housing part 8a which encloses the friction plate 3, the pressure plate 7 and a cup-spring 54. The housing part 8a is connected by the cup-spring 54 to the flange 9a of the bearing hub 10, and is thus held against movement in the axial direction but is rotatable with respect to the crankshaft "K". The axially-movable pressure plate 7 of the first clutch 1 is connected with the basket-shaped housing part 8a and with the axially fixed pressure plate 14b in such manner that it is held against rotation but is movable in the axial direction. Leaf springs 18a are disposed between the cup-spring 54 and the axially-fixed pressure plate 14b of the second clutch. The leaf springs 18a are fastened at one side thereof to projections 55a of the pressure plate 7, which in this embodiment are in the form of shoulder studs that extend axially through apertures of the cup spring 54. The leaf springs 18a are fastened at the other side thereof to the radially extending portions of the axially-fixed pressure plate 14b of the second clutch 2. These springs constitute resilient means for axially movably connecting the pressure plate 7 to the housing part 8a and/or to the pressure plate 14b.

The pressure plate 7 is spring loaded by the cup spring 54 in a direction toward the friction surfacings 4 and 5 of the carrier plate 3 and the axially fixed pressure plate 6. For this purpose, the cup spring 54 braces itself with its outer portion 54a against the basket-shaped housing part 8a with a ring-shaped seat 55. At the other side, an intermediate portion 54b of the cup spring 54 is seated on the protrusions 56 of the movable pressure plate 7.

The pull-rod 24a which is provided for disengagement of the clutch 1 is connected with the portion 31a of the throw-out plate 25a. The connection between the portion 31a and the pull-rod 24a is effected by a bayonet-type lock 57. The lock 57 produces a positive locking action between these parts in the circumferential direction, as well as in the direction of pull after the pull-rod 24 has been introduced into the throw-out plate 25a and has been rotated relative to the portion 31a.

The throw-out plate 25a has arms or pins 58 which extend through openings 59 provided in the flange 9a of the bearing hub 10. The arms 58 grip behind the radially innermost portions 54c of the cup spring 54.

The basket-shaped parts 8 and 8a of the first clutches 1 shown in FIGS. 1 and 2 respectively have starting surfaces 49 for friction wheels 50 having conical starting surfaces 50a. Each friction wheel 50 is mounted on a starting motor 51 which is only schematically indicated. The motor 51 is preferably a worm-drive starter whose axis 52 makes an acute angle with the axis of rotation of the clutch assembly, as shown in FIG. 1.

In order to start the internal combustion engine, the clutch 1 is disengaged, and possibly also the clutch 2 if the transmission is not in the neutral position. It is now assumed that the decoupling of the two clutches 1 and 2 is effected automatically, for example, by pressure controlled means on actuation of the ignition lock. After both clutches are disengaged the starter motor 51 is set in motion and the friction wheel 50 is moved in the direction of the arrow 50b until its surface 50a contacts the surface 49 and thereby accelerates the clutch unit to a predetermined number of revolutions. The engine is started by engaging the clutch 1. By operating the clutch 2, the vehicle can thereupon be operated in the known manner.

Under those operating conditions when the driving wheels drive the engine, i.e., when the car is coasting (during a so-called push-operation) or, for example, during a short or brief stop because of traffic, the clutch 1 can be disengaged and the internal combustion engine can either continue to run at a reduced number of revolutions or be turned off altogether. Since under these operating conditions the clutch 2 is also disengaged, the flywheel can continue to turn, and when the number of revolutions falls under a certain number, the flywheel can be brought to a higher number of revolutions. This can be effected by the starter motor and the friction wheel 50, or by the engine itself by engaging the clutch 1 when the number of revolutions has fallen below the threshold value. The engine is again started for a short period of time until the flywheel has reached the predetermined number of revolutions again, and the clutch 1 is again disengaged and the engine is shut off. When the need for power output for the engine exists again, the clutch 1 is engaged and the internal combustion engine is started again.

We claim:

1. Device for selectively connecting and separating the flywheel assembly of a friction clutch to and from a rotatable shaft, such as the crankshaft of an internal combustion engine, comprising a bearing in which the flywheel assembly is rotatable relative to the shaft, a friction plate having first friction surfaces disposed at the opposite sides thereof, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, said biasing means being elastic, as considered in the axial direction of said flywheel assembly, and being affixed to the shaft and to said friction plate so that the centers of said first friction surfaces are located on the axis of the shaft, means for holding said biasing means against rotation with reference to said friction plate, and stop means for limiting the extent of axial movement of said first friction surfaces.

2. Device according to claim 1, wherein said stop means includes means for preventing stray movements of said first friction surfaces when said biasing means is contacted by said stop means.

3. Device according to claim 1, wherein said bearing includes a hub which is rotatable relative to the shaft, said flywheel assembly further including a housing part disposed on said hub, said one pressure plate being concentrically supported by said housing part and said other pressure plate being disposed in an axial space defined by said housing part and the flywheel assembly.

4. Device according to claim 3, wherein said flywheel assembly further comprises axially elastic means for non-rotatably connecting said other pressure plate to said housing part.

5. Device according to claim 4, wherein said connecting means are disposed in said axial space defined by said housing part and the flywheel assembly.

6. Device for selectively connecting and separating the flywheel assembly of a friction clutch to and from a rotatable shaft, such as the crankshaft of an internal combustion engine, comprising a bearing in which the flyhweel assembly is rotatable relative to the shaft, a friction plate having first friction surfaces disposed at the opposite sides thereof, means for nonrotatably connecting said friction plate to the shaft, two pressure plates forming part of the flywheel assembly and each having a second friction surface adjacent to one of said first friction surfaces, said pressure plates being axially movably but nonrotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, means for adjusting the extent of axial movement of said first friction surfaces, and stop means for limiting the extent of axial movement of said first friction surfaces.

7. Device according to claim 6, further comprising means for non-rotatably connecting said biasing means to the shaft.

8. Device according to claim 6, wherein said stop means is disposed intermediate the connection between said biasing means and the shaft on the one hand and said first friction surfaces on the other hand.

9. Device for selectively connecting and separating the flywheel assembly of a friction clutch to and from a rotatable shaft, such as the crankshaft of an internal combustion engine, comprising a bearing in which the flywheel assembly is rotatable relative to the shaft, a friction plate having first friction surfaces disposed at the opposite sides thereof, means for nonrotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, said biasing means being elastic, as considered in the axial direction of said flywheel assembly, and stop means for limiting the extent of axial movement of said first friction surfaces, said stop means being effective between said biasing means and said friction plate.

10. Device for selectively connecting and separating the flywheel assembly of a friction clutch to and from a rotatable shaft, such as the crankshaft of an internal combustion engine, comprising a bearing in which the flywheel assembly is rotatable relative to the shaft, a friction plate having first friction surfaces disposed at the opposite sides thereof, said friction plate including a carrier for said first friction surfaces, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, said biasing means and said carrier being movable axially with respect to each other, and stop means for limiting the extent of axial movement of said first friction surfaces, said stop means constituting screws adjustably fastened to said carrier and movable into contact with said biasing means.

11. Device according to claim 10, wherein said screws are self-locking.

12. Device for selectively connecting and separating the flywheel assembly of a friction clutch to and from a rotatable shaft, such as the crankshaft of an internal combustion engine, comprising a bearing in which the flywheel assembly is rotatable relative to the shaft, a friction plate having first friction surfaces disposed at the opposite sides thereof, means for nonrotatably connecting said friction plate to the shaft, two pressure plates forming part of the flywheel assembly and each having a second friction surface adjacent to one of said first friction surfaces, said pressure plates being axially movably but nonrotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, and stop means for limiting the extent of axial movement of said first friction surfaces, said stop means including deformed portions of said friction plate.

13. Device for selectively connecting and separating the flywheel assembly of a friction clutch to and from a rotatable shaft, such as the crankshaft of an internal combustion engine, comprising a bearing in which the flywheel assembly is rotatable relative to the shaft, a friction plate having first friction surfaces disposed at the opposite sides thereof, means for nonrotatably connecting said friction plate to the shaft, two pressure plates forming part of the flywheel assembly and each having a second friction surface adjacent to one of said first friction surfaces, said pressure plates being axially movably but nonrotatably connected to each other and one of said pressure plates being connected to said bearing against axial movement with reference thereto, means for moving the other of said pressure plates axially, means disposed between the shaft and said first friction surfaces for yieldably biasing said friction plate axially in a direction away from said one pressure plate, and stop means for limiting the extent of axial movement of said first friction surfaces, said stop means being arranged to limit the extent of axial movement of said first friction surfaces to at least substantially half the extent of axial movement of said other pressure plate.

14. Device for selectively connecting and separating the flywheel assembly of a friction clutch to and from a rotatable shaft, such as the crankshaft of an internal combustion engine, comprising a bearing in which the flywheel assembly is rotatable relative to the shaft, said bearing including a hub which is rotatable relative to the shaft and said flywheel assembly including a housing part disposed on said hub, a friction plate having first friction surfaces disposed at the opposite sides thereof, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, said one pressure plate being concentrically supported by said housing part and said other pressure plate being disposed in an axial space defined by said housing part and open toward said one pressure plate, said housing part having a radially extending portion and said other pressure plate having protrusions extending axially through openings formed in said radially extending portion of said housing part, means disposed between the shaft and said first friction surfaces for yieldably biasing said friction plate axially in a direction away from said one pressure plate, and stop means for limiting the extent of axial movement of said first friction surfaces.

15. Device for selectively connecting and separating a flywheel assembly to and from a rotatable shaft, such as the crankshaft of an internal combustion engine, comprising a bearing in which the flywheel assembly is rotatable relative to the shaft, said bearing including a hub which is rotatable relative to the shaft and said flywheel assembly including a housing part disposed on said hub, a friction plate having first friction surfaces disposed at the opposite sides thereof, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, said one pressure plate being concentrically supported by said housing part and said other pressure plate being disposed in an axial space defined by said housing part and open toward said one pressure plate, said housing part having a radially extending portion and said other pressure plate having protrusions extending axially through openings formed in said radially extending portion of said housing part, means disposed between the shaft and said first friction surfaces for yieldably biasing said friction plate axially in a direction away from said one pressure plate, stop means for limiting the extent of axial movement of said first friction surfaces, and a clutch having an axially fixed pressure plate disposed in the vicinity of said housing part.

16. Device according to claim 15, further comprising a cup-spring disposed between the pressure plate of said clutch and said protrusions.

17. Device according to claim 16, wherein the pressure plate of said clutch has axially extending bosses attached to said housing part and extending through openings provided in said cup-spring so as to hold said cup-spring concentrically with said flywheel assembly.

18. Device according to claim 16, wherein said cup-spring has a radially outermost portion axially braced against the pressure plate of said clutch and a second portion bearing against said protrusions.

19. Device according to claim 18, wherein said moving means includes an axially movable pull rod coaxial with the shaft and including a throw-out plate adjacent to an innermost third portion of said cup-spring, said throw-out plate being movable axially with said pull-rod.

20. Device according to claim 19, wherein said pull rod is arranged to disengage said axially movable pressure plates from said friction plate when moved axially in a direction away from said one pressure plate.

21. Device according to claim 20, wherein the direction of disengagement of said clutch is the same direction of disengagement of said axially movable pressure plates from said friction plate.

22. Device according to claim 19, wherein said hub includes an apertured radial flange and said means for non-rotatably connecting said friction plate to the shaft is accessible through the apertures of said flange.

23. Device according to claim 22, wherein said throw-out plate has apertures substantially in alignment with the apertures of said radial flange.

24. Device according to claim 19, including bayonet means disposed on said pull rod and throw-out plate for positively locking said pull rod to said throw-out plate when rotating said pull rod relative to said throw-out plate subsequent to insertion of said pull rod into said throw-out plate.

25. Device according to claim 19, further comprising a trunnion coaxial with said throw-out plate and having an extension extending into a bore of said hub for axially guiding and supplying fixed radial support to said throw-out plate.

26. Device according to claim 25, wherein said extension has an internal thread and said pull rod has an external thread meshing with said internal thread.

27. Device according to claim 25, further comprising a guide bearing provided in said bore between said extension and said hub.

28. Device for selectively connecting and separating the flywheel assembly of a friction clutch to and from a rotatable shaft, such as the crankshaft of an internal combustion engine, comprising a bearing in which the flywheel assembly is rotatable relative to the shaft, said bearing including a hub which is rotatable relative to the shaft and said flywheel assembly including a housing part disposed on said hub, a friction plate having first friction surfaces disposed at the opposite sides thereof, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, said one pressure plate being form-fittingly connected to and being concentrically supported by said housing part and said other pressure plate being disposed in an axial space defined by said housing part and open toward said one pressure plate, means disposed between the shaft and said first friction surfaces for yieldably biasing said friction plate axially in a direction away from said one pressure plate, and stop means for limiting the extent of axial movement of said first friction surfaces.

29. Device according to claim 28, wherein said one pressure plate has circumferentially disposed profiles and said housing part has gripping portions extending into said profiles, as considered in the axial direction of said flywheel assembly.

30. Device for selectively connecting and separating the flywheel assembly of a friction clutch to and from a rotatable shaft, such as the crankshaft of an internal combustion engine, comprising a bearing in which the flywheel assembly is rotatable relative to the shaft, said bearing including a hub which is rotatable relative to the shaft and said flywheel assembly including a housing part disposed on said hub, a friction plate having first friction surfaces disposed at the opposite sides thereof, means for non-rotatably connecting said friction plate to the shaft, two pressure plates forming part of the flywheel assembly and each having a second friction surface adjacent to one of said first friction surfaces, said pressure plates being axially movably but non-rotatably connected to each other and one of said pressure plates being connected to said bearing against axial movement with reference thereto, means for moving the other of said pressure plates axially, said one pressure plate being concentrically supported by said housing part and said other pressure plate being disposed in an axial space defined by said housing part and open toward said one pressure plate, said one pressure plate and said housing part having welded-together radially outermost portions, means disposed between the shaft and said first friction surfaces for yieldably biasing said friction plate axially in a direction away from said one pressure plate, and stop means for limiting the extent of axial movement of said first friction surfaces.

31. Device for selectively connecting and separating a flywheel assembly to and from a rotatable shaft, such as the crankshaft of an internal combustion engine, comprising a bearing in which the flywheel assembly is rotatable relative to the shaft, said bearing including a hub which is rotatable relative to the shaft and said flywheel assembly including a housing part disposed on said hub, a first friction plate having first friction surfaces disposed at the opposite sides thereof, means for non-rotatably connecting said friction plate to the shaft, first and second pressure plates forming part of the flywheel assembly and each having a second friction surface adjacent to one of said first friction surfaces, said pressure plates being axially movably but non-rotatably connected to each other and said first pressure plate being connected to said bearing against axial movement with reference thereto, means for moving said second pressure plate axially, said first pressure plate being concentrically supported by said housing part and said second pressure plate being disposed in an axial space defined by said housing part and open toward said first pressure plate, means disposed between the shaft and said first friction surfaces for yieldably biasing said friction plate axially in a direction away from said first pressure plate, stop means for limiting the extent of axial movement of said first friction surfaces, a first diaphragm spring disposed between said housing part and said second pressure plate and having a radially outermost portion bearing against said housing part and a second portion bearing against said second pressure plate, said housing part having a radially extending portion connected with said bearing and further comprising a clutch including third and fourth pressure plates, a second friction plate and a second diaphragm spring, said first friction plate being disposed between said first and second pressure plates, said first spring being disposed between said second pressure plate and said radially extending portion of said housing part, said second friction plate being disposed between said third and fourth pressure plates, said radially extending portion of said housing part being disposed between said first spring and said third pressure plate, and said fourth pressure plate being disposed between said second friction plate and said second spring, as considered in the axial direction of said flywheel assembly.

32. Device according to claim 31, wherein said first diaphragm spring has apertures and said second pressure plate includes projections extending through said apertures, and further comprising resilient means for securing said projections to said housing part so that said second pressure plate is free to move axially of but is held against angular movement relative to said housing part.

33. Apparatus for actuating a friction clutch of the type having a flywheel and a diaphragm spring including radially inner portions, comprising an axially movable rotary actuating member having an end portion; a motion transmitting member provided on said actuating member inwardly of said end portion and arranged to shift said portions of said spring axially in response to axial movement of said actuating member; and bearing means forming part of said flywheel and having a socket axially movably receiving and rotatable with said end portion of said actuating member.

34. The apparatus of claim 33, further comprising a tubular member, said actuating member being movable axially in said tubular member.

35. The apparatus of claim 33, further comprising a bushing provided in said socket and axially movably receiving the end portion of said actuating member.

36. The apparatus of claim 33, wherein said actuating member is a rod.

37. The apparatus of claim 33, wherein said actuating member includes a smaller-diameter portion which includes said end portion and a larger-diameter portion outside of said socket.

38. The apparatus of claim 33, wherein said motion transmitting member is separable from said actuating member.

39. The apparatus of claim 33, further comprising a tubular member, said actuating member having a second portion reciprocable in said tubular member, said portions of said actuating member being disposed at the opposite sides of said motion transmitting member.

40. The apparatus of claim 33, wherein said motion transmitting member is a substantially plate-like annular component having an outer marginal portion adjacent to said portions of said spring.

41. The apparatus of claim 33, further comprising means for maintaining said motion transmitting member in engagement with said portions of said spring.

42. The apparatus of claim 33, further comprising a hollow transmission shaft, said actuating member being movable axially in said transmission shaft.

43. Apparatus for actuating a friction clutch of the type having a diaphragm spring including radially inner portions and a centrally located opening, comprising a hollow transmission shaft; a rotary actuating member which is axially movable in said transmission shaft and has an end portion extending through and beyond the opening of said diaphragm spring; a motion transmitting member provided on said actuating member inwardly of said end portion and arranged to shift said portions of said spring axially in response to axial movement of said actuating member in order to change the condition of the clutch; and bearing means including the crankshaft of an internal combustion engine and having a socket axially movably receiving and rotatable with said end portion of said actuating member.

* * * * *

UNITED STATES PATENT AND TRADEMARK OFFICE
CERTIFICATE OF CORRECTION

PATENT NO.  : 4,520,913
DATED       : June 4, 1985
INVENTOR(S) : Paul Maucher and Oswald Friedmann It is certified that error appears in the above-identified patent and that said Letters Patent are hereby corrected as shown below:

Claim 43, line 12, "crankshaft" should be changed to --shaft--.

Signed and Sealed this

Eighth Day of September, 1987

Attest:

DONALD J. QUIGG

Attesting Officer

Commissioner of Patents and Trademarks